Figure 1:
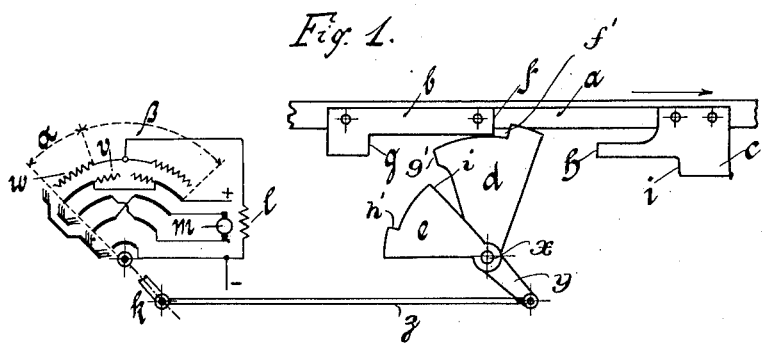

C. KRÄMER.
APPARATUS FOR ELECTRICALLY CONTROLLING MACHINE TOOLS.
APPLICATION FILED NOV. 22, 1909.

1,028,033.

Patented May 28, 1912.

UNITED STATES PATENT OFFICE.

CHRISTIAN KRÄMER, OF FRANKFORT-ON-THE-MAIN, GERMANY, ASSIGNOR TO THE FIRM OF FELTEN & GUILLEAUME-LAHMEYERWERKE ACTIEN GESELLSCHAFT, OF FRANKFORT-ON-THE-MAIN, GERMANY.

APPARATUS FOR ELECTRICALLY CONTROLLING MACHINE-TOOLS.

1,028,033.  Specification of Letters Patent.  Patented May 28, 1912.

Application filed November 22, 1909. Serial No. 529,406.

*To all whom it may concern:*

Be it known that I, CHRISTIAN KRÄMER, a subject of the German Emperor, and a resident of Frankfort-on-the-Main, Germany, have invented certain new and useful Improvements in Apparatus for Electrically Controlling Machine-Tools, of which the following is a specification.

This invention relates to an apparatus for controlling machine tools which are driven by an electric motor, and especially to tools which must be reversed like planers, etc. It has been the practice heretofore to provide such machine tool with a single motor, which was reversed by means of an ordinary switch. It has also been the practice to strengthen the field of the motor when the current in the armature was reversed, so as to reduce the speed at the time of reversal. This was accomplished by an ordinary reversing starter in which the arm was thrown over in one movement to strengthen the field and reverse the current in the armature. This method of direct reversing can be used satisfactorily in case the motor is small, but is very unsatisfactory in case the motor is large for the following reason: It takes an appreciable time for the magnetism to follow the current when the current is varied, due to hysteresis, etc. If therefore the arm of the starter is thrown to reversing position by a continuous movement, the field of the motor will not be strengthened by the time the arm reaches the reversing contacts, so that the speed of the motor will not be reduced at the time that the current in the armature is reversed. In the prior constructions, the time constant of the field winding of the motor was not taken into consideration.

The object of this invention is to provide a method of and an apparatus whereby the direct reversing idea may be applied to motors driving heavy machine tools.

In accordance with this invention, the driving motor is not reversed by simply turning over the starting switch at the end of the operative travel of the reciprocating member of the machine tool, but means are provided whereby an appreciable time limit is allowed between the strengthening of the field of the motor and the reversal of the current in the armature so as to permit the magnetization of the field to follow the exciting current and be fully established before the current in the armature is reversed. This is accomplished by cutting out all or a part of the field resistance a given time before the reversing switch proper is thrown.

The invention will be described in connection with the accompanying drawings, in which—

Figure 2:
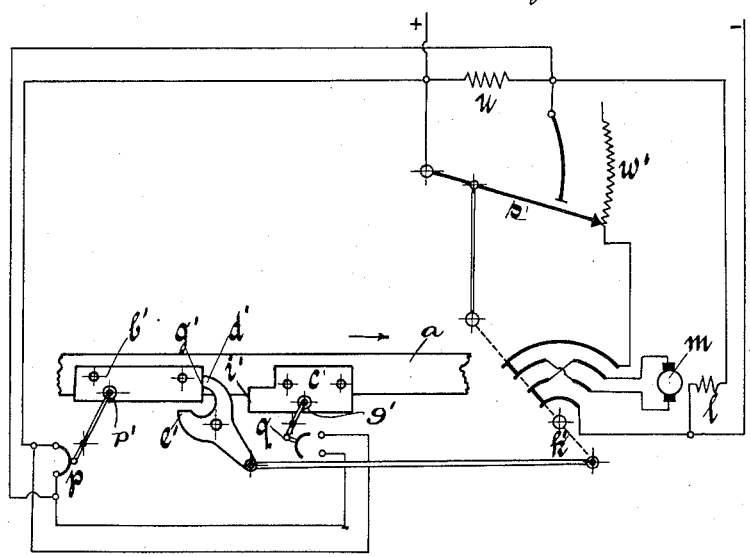

Figure 1 is a diagrammatical view showing one form of this invention; and Fig. 2 is a diagrammatical view showing another form of this invention.

In Fig. 1, $a$ is the reciprocating table of a planer and $k$ is the contact lever of the reversing switch for controlling the electric motor $m$ which drives the planer. According to this invention, the starting lever is not pulled by a single movement from one end position into the other, but is moved, for instance from the position illustrated, step by step, at the first step only to the extent of an angle $\alpha$ whereby the resistance $w$ is switched out from the exciter circuit, and the field of the motor is strengthened to a corresponding extent. The lever remains in the first position until the required strengthening of the field or reduction of speed has actually taken place, and then it is moved another step to the extent of the angle $\beta$ into the end position corresponding to the opposite direction of rotation. During the last movement, a resistance $v$ is connected in circuit with the armature as usual. The movement of the lever $k$ is effected as usual by means of stops $b$ and $c$ which can be adjusted on the table of the planer and which are not only located and move in different vertical planes, but are also provided each with two stop shoulders $f$, $g$ and $h$, $i$. The stop shoulders are in different horizontal planes and engage with corresponding stop shoulders $f'$, $g'$, $h'$, $i'$, respectively, on tappets $e$ and $d$ fixed on a movable shaft $x$ which has rigidly secured thereto an arm $y$ connected to lever $k$ by a link $z$. The tappet $e$ is located in front of $d$ to correspond to the position of the stops $c$ and $b$ respectively. In the drawing the table $a$ is shown near the end of its movement in the direction of the arrow. Toward the end of the movement, the stop shoulder $f$ strikes the shoulder $f'$ which is in its path, and turns the shaft $x$ as well as the lever $k$ through the angle $a$, so that owing to the resistance $w$ being switched out, the pressure supplied to and therefore the strength of the field winding $l$ of the motor $m$ is increased. After the expiration of the time determined by the distance apart of the stop shoulders $f$ and $g$ in their direction of movement, the stop shoulder $g$ will engage the shoulder $g'$ which has been moved into its path and turn shaft $x$ and therefore lever $k$ through the angle $b$, causing the current in the motor armature to be reversed so that the direction of movement of the table is reversed. Toward the end of the reverse movement, the stop shoulder $h$ engages $h'$ to move shaft $x$ and therefore lever $k$ back through the angle $a$, and the complete reversing is effected after the expiration of the time required by means of the stop $i$ engaging $i'$. It will be noted that when the lever $k$ moves through the angle $b$ in either direction, that the resistance $v$ is first cut in the armature circuit and then cut out in the latter part of the movement and after the current in the armature has been reversed. During the latter part of movement, the resistance $w$ is again cut in so as to reduce the field strength back to normal. In this construction the two stop shoulders of each stop must be a certain distance apart, and a considerable movement of the planer table is required in order to move the lever $k$ to switch in the resistance $w$. It is, therefore, practically impossible to bring about the proper operation when the movement of the reciprocating member is short. In order therefore to enable, for instance, a planer to be used for short cuts, it is necessary to make the travel of the table comparatively long, namely, a distance equal to the length of cut, plus double the distance for producing time limit required for strengthening the field, plus the distance required for the reversing proper.

The arrangement shown in Fig. 2 enables, however, the reversing to be effected for short lengths of travel. This is accomplished by operating the switch device for producing the strengthening of the field through a friction coupling which causes the switch to operate quickly so that it is not necessary to require a long travel of the planer table for this purpose. For reversing the drive of a planer table $a$, the latter is provided with stops $b'$ and $c'$ which are arranged on the table in an adjustable manner and can engage with the shoulders $d'$ or $e'$ of a tappet and turn the latter, so that it turns the switch lever $k'$ of the motor $m$ from one end position to the other, as described in connection with Fig. 1. To the switch lever $k'$ is connected the arm $s$ of a regulating resistance $w'$, for the field $l$ of motor $m$. Parallel to the resistance $w'$ is connected a resistance $u$ which can be short circuited by means of the switches $p$ and $q$. The switches $q$ and $p$ are pivoted as shown and provided at their upper ends with frictional pads $p'$ $q'$, which frictionally engage the outer surfaces of the stops $b'$, $c'$ so as to be moved thereby in a manner hereinafter to be described. When the table $a$ is traveling in the direction indicated by the arrow, whatever be the portion of the lateral face of $b'$ with which the frictional pad $p'$ of the switch $p$ is in engagement, the said switch is at once forced into the position shown in the drawing, in which its contacts short-circuit the resistance $u$ in the manner required, so that the motor field is strengthened before reversing takes place. Then the stop shoulder $g'$ of the stop $b'$ engages with the stop $d'$ and the reversing is effected. It will be seen that in the new arrangement the required strengthening of the field necessitates a very small travel of the planer table. The same operation takes place at the stop $c'$ and switch $q$, as at the stop $b'$ and switch $p$. The essential point of this last construction is the arrangement owing to which each of the switches $p$, $q$ are quickly closed during a movement of the table in one direction, but during slight reverse movement are also quickly opened again, whatever be the place at which the reversing stops are located. This is necessary for the following reasons: When the table has completed its travel, and the reverse movement begins, the renewed weakening of the field, that is to say, the increase in the number of revolutions must be independent of the said switches, and dependent only on the reversing apparatus. This is only possible when as already stated, the said switches are again opened even at a slight backward movement. This requirement is fulfilled by the switch levers being moved in either direction by the frictional couplings described.

In machines with different speeds during the working and the idle period, the increase of field in both directions of movement can be made different if desired and in certain circumstances the distances of the stop shoulders $f$, $g$, $h$, and $i$ could also be made different. Instead of strengthening the field by means of the reversing switch lever proper, a separate switch can also be used.

Having thus described the invention, what is claimed is:

1. The combination with a reciprocating member and a motor for driving the same, of controlling means for varying the speed of and for reversing the motor, and a series of stops actuated from said reciprocating member for operating said first means in succession near each limit of movement of said member with a given time limit between the successive operations.

2. The combination with a reciprocating member and a motor for driving the same and provided with a field, of controlling means for reversing the motor and for increasing the field excitation prior to reversal, means for operating said controlling means in steps with a given time limit between the steps, and means for adjusting said operating means.

3. The combination with a reciprocating member and a motor for driving the same and having a field, of means for reversing the motor and for varying the field excitation a given time limit prior to reversal, and frictional means for controlling the excitation of the field.

4. The combination with a reciprocating member and a motor for driving the same and having a field, of means for reversing the motor, means for varying the field excitation a given time limit prior to reversal, said last means being restored back to normal position upon reversal of said member.

5. The combination with a reciprocating member and a motor for driving the same and having a field, of means for reversing the motor, and means having a frictional engagement with said reciprocating member for varying the field excitation a given time limit prior to reversal.

6. The combination with a reciprocating member and a motor for driving the same and having a field, of means for reversing the motor, and a plurality of controlling devices operated at the limits of movements of said reciprocating member for varying the excitation of the motor.

7. The combination with a reciprocating member and a motor for driving the same and having a field, of means for reversing the motor, a resistance in the motor field circuit, and a plurality of switches operated at the limits of movements of said reciprocating member to short circuit said resistance.

8. The combination with a reciprocating member and a motor for driving the same and having a field, of means for reversing the motor, and a plurality of controlling devices having a frictional engagement with said reciprocating member to vary the field excitation a given time limit prior to reversal.

9. The combination with a reciprocating member and a motor for driving the same and having a field, of means for reversing the motor, and a controlling member adapted upon slight movements of said reciprocating member in one direction to increase the field excitation, and in the opposite direction to restore the excitation back to normal.

In testimony whereof I have signed my name to this specification in the presence of two subscribing witnesses.

CHRISTIAN KRÄMER.

Witnesses:
 ERWIN DIPPEL,
 CARL GRUND.